United States Patent [19]

Chikkaswamy et al.

[11] Patent Number: 5,625,889
[45] Date of Patent: Apr. 29, 1997

[54] RF SNIFFER MODULE AND METHOD WITH A SELF-TEST CIRCUIT

[75] Inventors: Keerthilatha Chikkaswamy, Gaithersburg, Md.; Harry Johnson, Springfield, Va.

[73] Assignee: Hughes Electronics, Los Angeles, Calif.

[21] Appl. No.: 372,510

[22] Filed: Jan. 13, 1995

[51] Int. Cl.[6] .................................................. H04B 17/02
[52] U.S. Cl. ...................... 455/67.1; 455/33.1; 455/226.4
[58] Field of Search .......................... 455/33.1, 33.3, 455/34.1, 34.2, 33.4, 67.1, 58.1, 58.2, 54.1, 226.1, 226.2, 180.1, 188.1, 161.3, 314, 315, 67.4, 63, 226.4; 379/58, 59

[56] References Cited

U.S. PATENT DOCUMENTS

| | | | |
|---|---|---|---|
| 3,736,512 | 5/1973 | Gowan | 455/226.1 |
| 4,360,928 | 11/1982 | Campbell | 455/226.4 |
| 4,531,235 | 7/1985 | Brusen | 455/273 |
| 4,704,734 | 11/1987 | Menich et al. | 455/33.3 |
| 4,747,101 | 5/1988 | Akaiwa et al. | 370/95 |
| 4,856,083 | 8/1989 | Makino | 455/166 |
| 5,027,431 | 6/1991 | Tanaka et al. | 455/214 |
| 5,108,334 | 4/1992 | Eschenbach et al. | 455/314 |

OTHER PUBLICATIONS

Cellular Digital Packet Data System Specification, Release 1.0 Jul. 19, 1993.

*Primary Examiner*—Reinhard J. Eisenzopf
*Assistant Examiner*—Lee Nguyen
*Attorney, Agent, or Firm*—John T. Whelan; Wanda Denson-Low

[57] ABSTRACT

A RF sniffer module and method for detecting the availability of cellular communication channels for data transmission. The module monitors the channels used in a cellular communication network to determine when a particular channel is idle, meaning it is not being currently used for communication. The module communicates the status of the channel to an overlay system. Thus, the overlay system is informed that a particular channel is idle and thus can be used for data transmission or that the channel is not available and thus the overlay system can not use that channel without interfering with the operation of the cellular communication network.

16 Claims, 4 Drawing Sheets

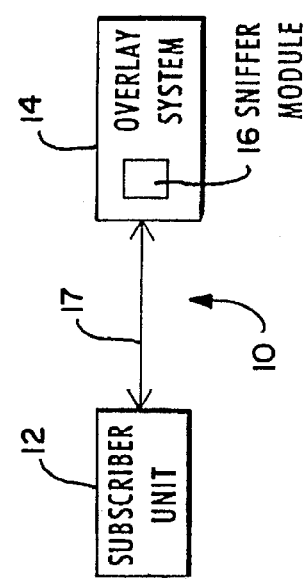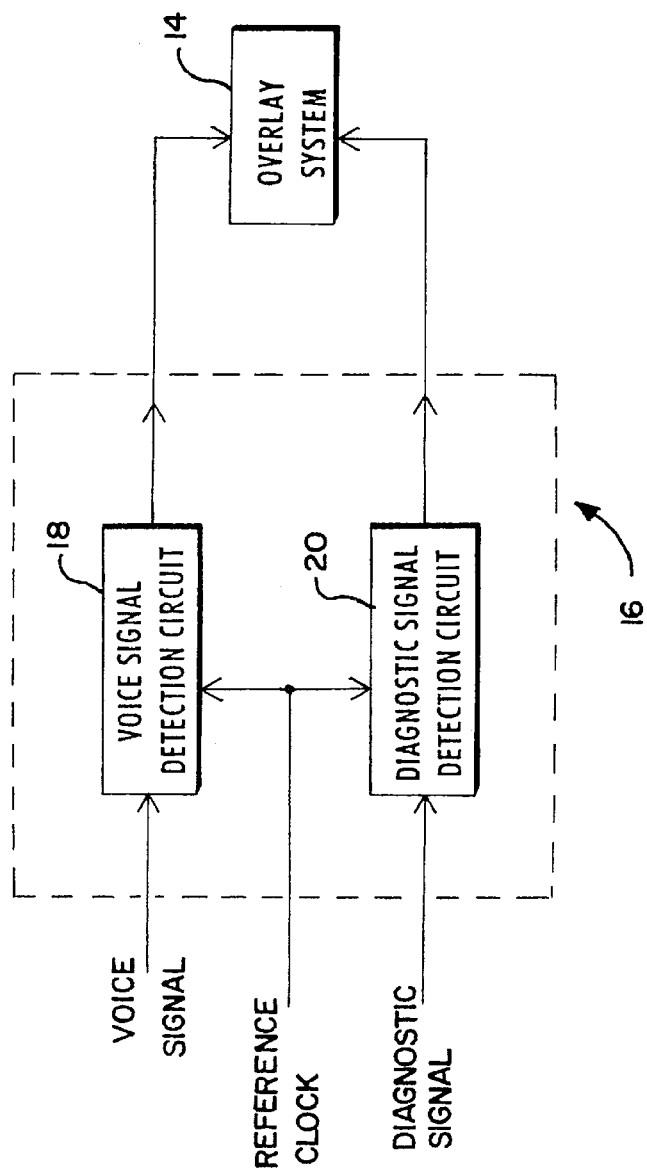
FIG. 1A
FIG. 2

RF SNIFFER MODULE AND METHOD WITH A SELF-TEST CIRCUIT

BACKGROUND OF THE INVENTION

Existing cellular network systems have enjoyed great popularity in recent years. At various times, the channels that carry the voice communications of the cellular system may be idle (i.e. no signal transmission over the channel at a particular time). These unused or idle voice channels may be utilized for other communication such as data communication. In particular, an overlay system network utilizing unused or idle voice channels for digital data communication is desirable. Cellular Digital Packet Data (CDPD) is an overlay system which provides mobile datagram service utilizing existing cellular telephone networks. The CDPD system allows digital data transmission over idle channels of an already existing cellular system. A consortium of cellular communication carriers prepared and released in 1993 a specification entitled "Cellular Digital Packet Data System Specification." The specification suggests that monitoring devices known as "sniffers" can be used to determine the current usage of allocated non-CDPD channels.

It is thus desirable to provide a detection system for use with an overlay system which detects channel occupancy in a cellular system so that the transmission of digital data over the overlay system does not interfere with the voice communications or any system diagnostics occurring in the underlying cellular network system.

SUMMARY OF THE INVENTION

The present invention is directed to a circuit and method for detecting the presence of radio signals arising from cellular communication systems, such as voice signals and diagnostic signals, and communicating such detection to an overlay system so that the overlay system can utilize unused or idle channels of the cellular system without causing interference with the voice or diagnostic functions of the cellular system.

The invention itself, together with further objects and attendant advantages, will best be understood by reference to the following detailed description, taken in conjunction with the accompanying drawings.

BRIEF DESCRIPTION OF THE DRAWINGS

FIG. 1A is a block diagram of an overlay system and the RF sniffer module.

FIG. 2 is a block diagram illustrating generally the components of the RF sniffer module of the present invention.

DETAILED DESCRIPTION OF THE DRAWINGS

The present invention relates to a radio frequency (RF) signal detection circuit and method which may be used in an overlay system, such as the CDPD, which operates in conjunction with an existing cellular communication system. The RF signal detection circuit detects the presence of radio signals occurring in a channel of the cellular system indicating that that channel is not currently available for use by the overlay system to transmit data. The detection of radio signals is communicated to the overlay system so that the overlay system operates without interfering with the underlying existing cellular communication system.

Figure 1:
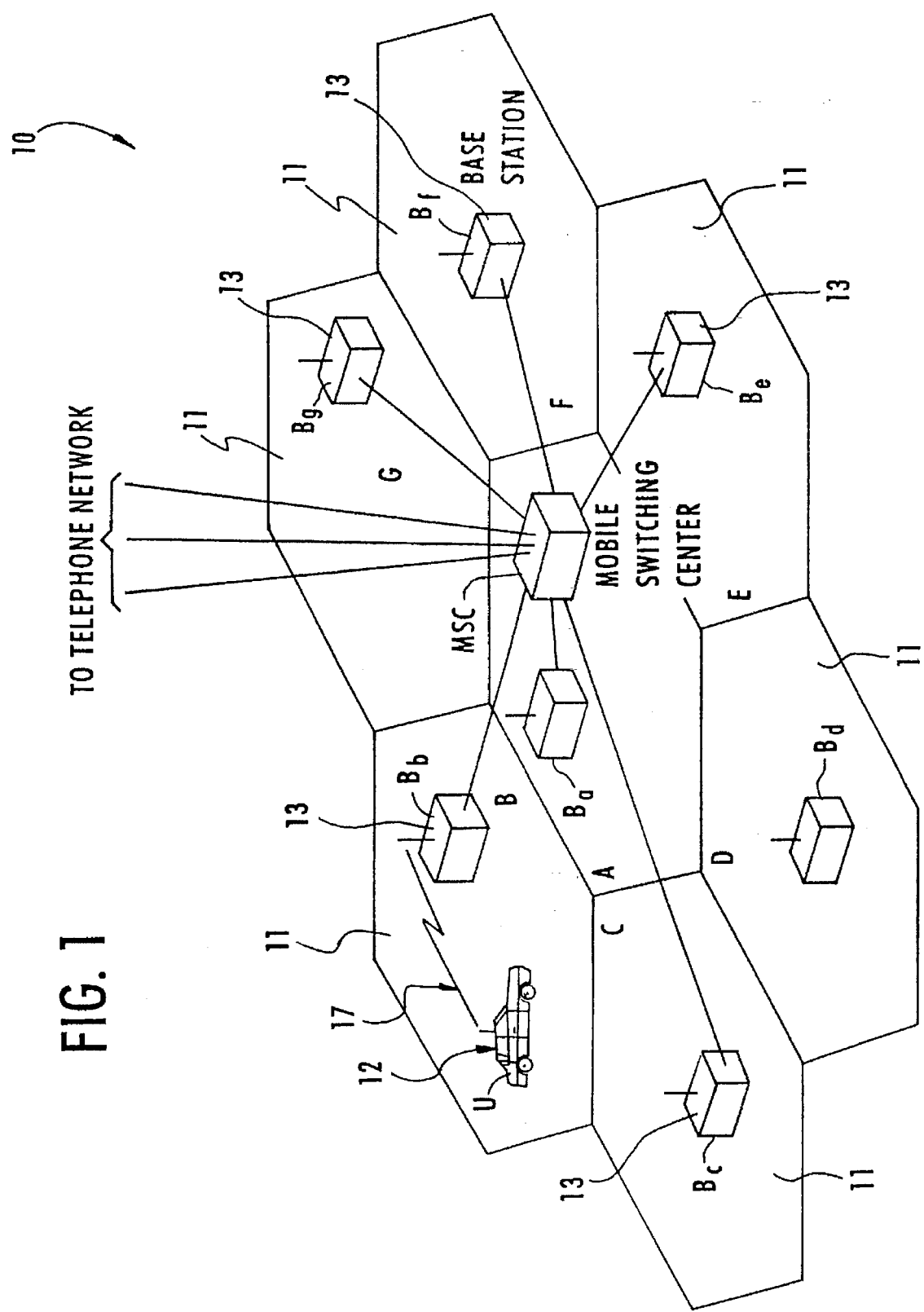
FIG. 1 is a general block diagram of an overlay system and its relation to remote subscriber units used in cellular systems.

FIG. 1 and FIG. 1A are general block diagram of an overlay system 10 and its relation to remote subscriber units 12 used in the underlying cellular communication system. In a very simplified description, which is intended for illustrative purposes only, existing cellular network communication systems include a plurality of remote subscriber units 12, for example, cellular telephones, that communicate with other mobile units or fixed wired units through base stations 13. A remote subscriber unit also includes those units that have been fixedly mounted. In particular, geographical areas are divided into cells 11 and within each cell 11 is a base station 13 which receives and transmits signals to and from the mobile units 12 located within that cell 11. Each cell may be divided into a number of sectors. Within each sector there are a plurality of channels available. The overlay system such as CDPD incorporates the already existing cellular network system and provides data communication over the channels of the cellular system. The overlay system may be in the form of components added to the cellular system or it may be integrated into the hardware of the cellular system itself. Thus the data communication of the overlay system is also wireless. While only one remote subscriber unit 12 is illustrated, an entire system of subscriber units communicate with the overlay system 10 over air link 17. The signal detection circuit of the present invention (also referred to as the RF sniffer module) is incorporated into the input of the overlay system 10. The RF sniffer circuit will now be described in greater detail with reference to FIGS. 2–4.

FIG. 2 is a block diagram illustrating generally the components of the RF sniffer module 16 of the present invention. The RF sniffer module 16 includes a voice signal detection circuit 18 and a diagnostic signal detection circuit 20. The voice signal detection circuit 18 and the diagnostic signal detection circuit 20 both communicate with the overlay system 14 to indicate the presence of a voice or diagnostic signal respectively. The voice signal detection circuit 18 receives as input, signals from the voice channels of the cellular system and the diagnostic signal detection circuit 14 receives as input diagnostic signals from the cellular system. Both the voice and diagnostic signal detection circuits are synchronized by a reference clock which will be described in greater detail hereinafter with reference to FIGS. 3 and 4.

Figure 3:
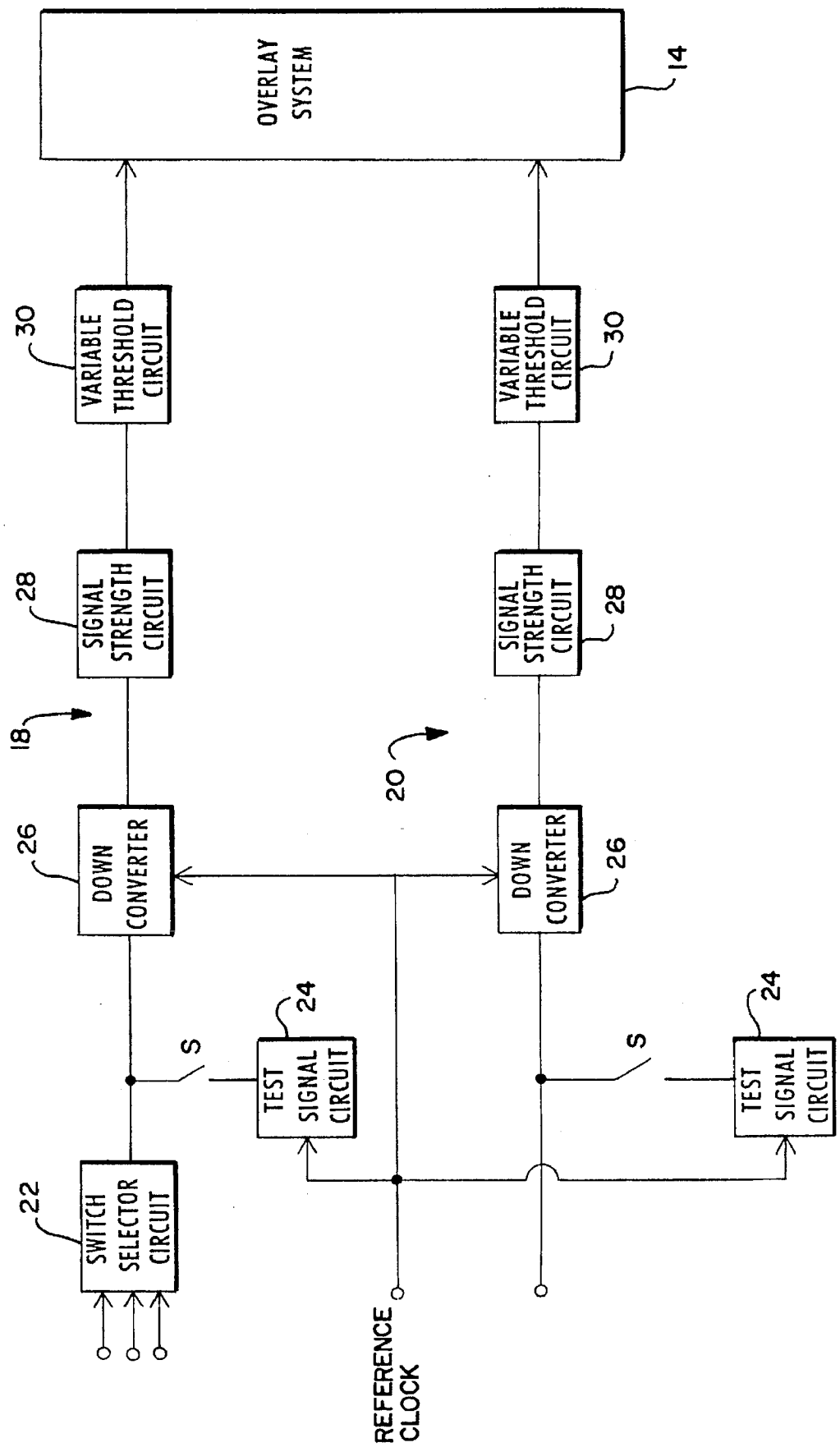
FIG. 3 is a block diagram of the RF sniffer module according to a preferred embodiment of the present invention.

FIG. 3 is a block diagram of the RF sniffer module according to a preferred embodiment of the present invention. Because the voice signal detection circuit 18 and the diagnostic signal detection circuit 20 are virtually identical, the voice signal detection circuit 18 will be described first and then the differences between the voice and diagnostic signal detection circuit will be described thereafter.

Figure 4:
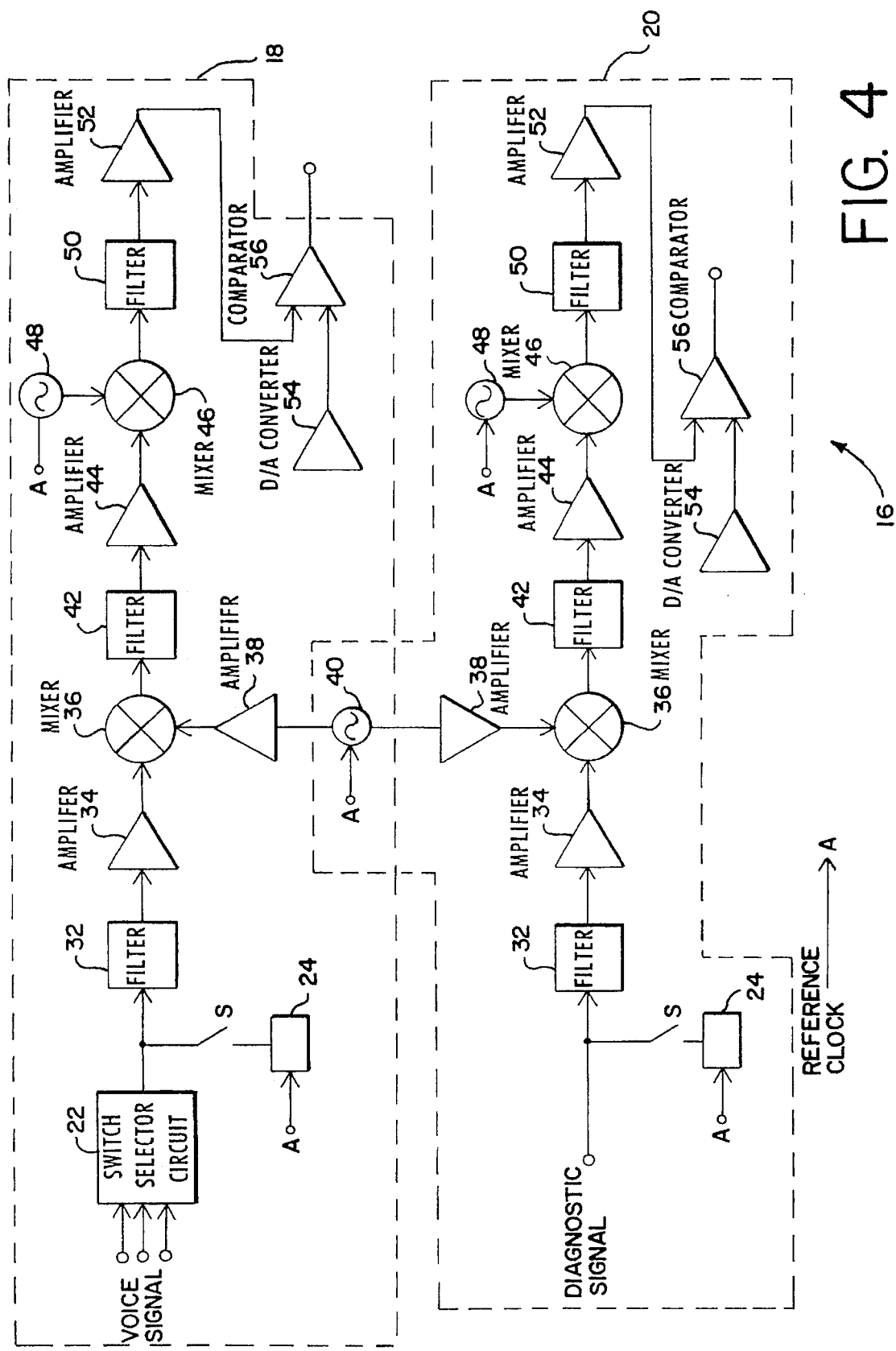
FIG. 4 illustrates the individual components of the RF sniffer module of FIGS. 2 and 3 according to a preferred embodiment.

First the components of the voice signal detection circuit 18 according to a preferred embodiment will be described followed by a description of the operation of the circuit. In a preferred embodiment, the voice signal detection circuit 18 includes a switch selector circuit 22, a test signal circuit 24, a down converter 26, a signal strength circuit 28 and a variable threshold circuit 30. FIG. 4, which will be described in detail hereinafter, illustrates the individual components of the voice and diagnostic detection circuits.

The switch selector circuit 22 receives as input, voice signals from a cellular communication network and multiplexes the voice signal from a sector of the cellular system to the remainder of the voice signal detection circuit. As previously described, the voice signal detection circuit is located in a unit of the overlay system that monitors communications over a cell site of a cellular system. Each cell site may be divided into multiple sectors, for example three sectors. Thus multiple inputs are illustrated as applied to the switch selector circuit 22. The present invention is not limited, however, to a particular number of inputs. For example, there may be greater than or less than three inputs depending upon the particular needs of the system and the environment in which it is placed. Also, instead of switching between inputs, the voice signal detection circuit 18 may allow as inputs a combination of multiple inputs through the use of a RF combiner, for example. In a preferred embodiment, the switch selector circuit 22 only multiplexes signals from one sector at a time. In a preferred embodiment, the switch selector circuit 22 is software controlled so that it switches the selector circuit 22 to a particular sector of the cell site. The switch selector circuit 22 may be switched as necessary so that it monitors each sector as required.

In a preferred embodiment, the radio signals are input to the switch selector circuit 22 through a RF coupler (not shown). The output of the switch selector circuit 22 is then passed through a down converter 26 to convert the input signal to a lower, intermediate frequency. The down converter 26 scans through the channels of the sector that is currently being monitored. The tuning of the down converter 26 is preferably software controlled. The output of the down converter 26 is applied to a signal strength circuit 28 which converts the output of the down converter 26 to a voltage proportional to the signal energy. The voltage output of the signal strength circuit 28 is applied to a variable threshold comparator circuit 30. A detection signal is generated by the comparator circuit 30 if the voltage output from the signal strength circuit 28 is greater than the threshold of the comparator circuit 30 thus indicating that the particular channel being monitored is not idle and that the overlay system may not use that channel to transmit data. If no detection signal is output from the comparator circuit 30, the overlay system is directed to use that particular channel to transmit data.

The diagnostic signal detection circuit 20 is virtually identical to the voice signal detection circuit 18 except that, in a preferred embodiment, the switch selector circuit is eliminated and the frequency parameters are different.

Both the voice signal detection circuit 18 and the diagnostic signal detection circuit 20 include a self-test feature to determine if the detection circuits are operating properly. In particular, a test signal circuit 24 generating a test signal in the form of a synthesized continuous wave provides a substitute input signal. The test signal circuit 24 may be coupled through software control to the input of the signal detection circuit when self testing is to be performed.

FIG. 4 illustrates the individual components of the RF sniffer module of FIGS. 2 and 3 according to a preferred embodiment of the present invention. As already discussed, because the voice signal detection circuit 18 and the diagnostic signal detection circuit 20 are virtually identical with respect to their individual components, only the voice signal detection circuit 18 need be described in detail.

The switch selector circuit 22 receives input signals from the voice channels of the cellular system. As previously described, the switch selector circuit 22 is software controlled to switch the circuit 22 to a particular sector thereby allowing any signals from that sector to be multiplexed as an input to the voice signal detection circuit 18. The down converter 26 of FIG. 3 is preferably formed by a first filter 32, first amplifier 34, first mixer 36, second amplifier 38, first synthesizer 40 (which preferably is also shared by the diagnostic signal detection circuit 20), second filter 42, third amplifier 44, second mixer 46, second synthesizer 48 and third filter 50. In a preferred embodiment, the first filter 32 is a wide band filter, the second filter 42 is a narrow SAW type bandpass filter and the third filter 50 is a narrow type ceramic bandpass filter. The first mixer 36 converts the input signal to a first intermediate frequency signal. The first synthesizer 40 and the first mixer 36 are controlled by software to tune the detection circuit to look at the channels of the particular sector being monitored. Thus, at any point in time, a particular channel in a particular sector is being monitored. The specific channel of interest is passed by the second bandpass filter 42 and amplified by third amplifier 44. The signal is then converted to a second intermediate frequency signal by the second mixer 46. The specific channel of interest is further isolated by third bandpass filter 50.

In a preferred embodiment, the signal strength circuit 28 (shown in FIG. 3) is formed by logarithmic amplifier 52. Amplifier 52 converts the input signal to a voltage corresponding to the logarithm of the signal energy.

The output of the logarithmic amplifier 52 is applied to the variable threshold comparator circuit 30 (see FIG. 3) formed by digital-to-analog converter 54 and comparator circuit 56. The comparator circuit 56 receives a first input from digital-to-analog converter 54 and a second input from logarithmic amplifier 52. The output of the digital-to-analog converter 54 provides the threshold of the comparator circuit 56 and is adjustable preferably through software control.

The output of the comparator circuit 56 is coupled to the overlay system (see FIGS. 2 and 3). If the voltage output by the logarithmic amplifier 52 is greater than the voltage output by the digital-to-analog converter 54, a detection signal is output from the comparator 56 indicating that the particular channel being monitored is not idle and that the overlay system may not use that channel to transmit data. If no detection signal is output from the comparator 56, the overlay system is allowed to transmit a burst of data information over that channel. Thus, the RF sniffer scans through the channels of the cellular system to find an available channel that the overlay system can use for data transmission.

The diagnostic signal detection circuit 20 is virtually identical to the voice detection circuit 18 except that certain parameters of the components will be different. In addition, in a preferred embodiment, the diagnostic detection circuit 20 does not require a selection switch as was required in the voice detection circuit 18. The output of the diagnostic detection circuit alerts the overlay system that diagnostic signal communications are occurring and that channel is not free for digital data communication.

Both the voice detection circuit and the diagnostic detection circuit include a self-test feature. In particular, a test signal circuit 24 may be coupled through a switch S, for example, to provide an input to the voice and diagnostic detection circuits to determine whether the detection circuits are operating properly. In another embodiment, the test signal circuit may be coupled directly to the input of the signal detection circuit. The self-testing feature is preferably implemented through software. The synthesizers which generate the signals used in the mixers and test signal circuits are all synchronized to the same reference clock using phase locked loop methods as is well known to those skilled in the art.

The various components shown in FIG. 4 are conventional, off-the-shelf components and thus need not be described in greater detail.

Although the same reference numerals have been used to identify like components of the voice and diagnostic signal detection circuits, it should be understood that the value of those components may be different for each circuit. A RF sniffer circuit was constructed and tested with the following parameters, although a RF sniffer circuit may be constructed with different parameters and the present invention is not limited to the particular parameters illustrated:

|  | frequency (MHZ) |
| --- | --- |
| voice signal detection circuit | |
| sector voice signal | 869–894 |
| test signal | 894.06 |
| synthesizer 40 | 954–979 |
| synthesizer 48 | 85.5 |
| filter 42 | 85.05 |
| diagnostic signal detection circuit | |
| diagnostic signal | 824–849 |
| test signal | 849.06 |
| synthesizer 48 | 129.6 |
| filter 42 | 130.05 |

As those of ordinary skill in the art will appreciate, many variations can be made to the particular preferred embodiments illustrated and the present invention is not limited to the preferred-embodiments illustrated. For example, while both a voice and diagnostic detection circuit are illustrated, the present invention is not limited to such an embodiment. It may be desirable, for example, to have only a voice signal detection circuit or only a diagnostic signal detection circuit. Also, the diagnostic signal detection circuit may be provided with a switch selector circuit or a combiner circuit to allow multiple diagnostic signal inputs.

In addition, while a preferred embodiment of the down converter circuit shown in FIG. 4 has a specific construction, many variations and modifications may be made to the down converter circuit. For example, instead of converting the input signal twice through the use of two mixers, a single conversion may suffice thereby eliminating the need for a second mixer 46 and synthesizer 48. Alternatively, the input signals may be directly converted using signal processing techniques thereby eliminating the need for a down converter circuit.

Other modifications are also possible such as increasing or decreasing the number of components such as amplifiers and filters depending upon the needs of the system and the environment in which it is placed. In addition, while a separate second synthesizer 48 is shown for the voice signal detection circuit and the diagnostic signal detection circuit, one synthesizer may be shared between the circuits. Also, with reference to the first synthesizer 40 which is shared between the voice and diagnostic signal detection circuits, each circuit may be provided with a separate, independently controlled synthesizer. With respect to the comparator circuit 30 there may be provided a variable or fixed threshold level implemented through software or hardware. Also, a digital comparison may be implemented by converting the output of the down converter circuit to a digital signal through the use of an analog-to-digital converter and comparing it to a digital threshold value using signal processing techniques.

While the RF sniffer circuit has been described in an analog system where each channel is on a separate frequency, the RF sniffer circuit can also be designed to be used with digital systems such as time division multiple access (TDMA) or code division multiple access (CDMA).

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A sniffer circuit for detecting idle communication channels of a cellular network system, the circuit comprising:

a switch selector for monitoring a particular channel, the switch selector receiving input signals from the cellular system;

a down converter coupled to the switch selector, the down converter converting the signal output from the switch selector to an intermediate frequency;

a signal strength circuit coupled to the down converter, the signal strength circuit converting the output of the down converter to a voltage proportional to energy of the output; and a comparator circuit coupled to the signal strength circuit, the comparator circuit comparing the output of the signal strength circuit with a threshold value and outputting a detection signal if the voltage output of the signal strength circuit is greater than the threshold of the comparator circuit thus indicating that the particular channel being monitored is not idle;

a self-test circuit coupled to the input of the down converter through a switch to provide a signal for testing the operation of the sniffer circuit; and a second sniffer circuit for detecting the presence of diagnostic signals, the second circuit comprising:

a second down converter receiving diagnostic signals from the cellular system as an input signal and converting the input signal to an intermediate frequency, a second signal strength circuit coupled to the down converter, the signal strength circuit converting the output of the down converter to a voltage proportional to the energy of the output; and a second comparator circuit coupled to the signal strength circuit, the comparator circuit comparing the output of the signal strength circuit with a threshold value and outputting a detection signal if the voltage output of the signal strength circuit is greater than the threshold of the comparator circuit thus indicating the presence of a diagnostic signal.

2. A sniffer circuit according to claim 1 wherein the down converter includes:

a first band pass filter coupled to the switch selector;

a first amplifier coupled to the output of the first bandpass filter;

a first synthesizer for generating a signal at a particular frequency;

a first mixer coupled to the output of the first amplifier and first synthesizer, the first mixer converting the input signal to an intermediate frequency.

a second bandpass filter coupled to the output of the first mixer;

a second amplifier coupled to the output of the second bandpass filter;

a second synthesizer for generating a signal at a particular frequency; and a second mixer coupled to the output of the second amplifier and second synthesizer, the second mixer converting the output of the second amplifier to an intermediate frequency signal.

3. A sniffer circuit according to claim 2 wherein the second bandpass filter is a SAW type filter.

4. A sniffer circuit according to claim 1 wherein the signal strength circuit comprises a logarithmic amplifier.

5. A sniffer circuit according to claim 1 wherein the comparator circuit comprises a digital-to-analog converter and a comparator having a first input coupled to the output of the signal strength circuit and a second input coupled to the output of the digital-to-analog converter.

6. A sniffer circuit according to claim 1 wherein the threshold value is programmable.

7. A sniffer circuit according to claim 1 further comprising a self-test circuit coupled to the input of the down converter through a switch to provide a continuous wave for testing the operation of the sniffer circuit.

8. A sniffer circuit according to claim 1 wherein the output of the self-test circuit is not tuned to the same channel as the downconverter.

9. A sniffer circuit according to claim 1 wherein the second sniffer circuit detects diagnostic signals.

10. A sniffer circuit according to claim 1 wherein the test signal is a continuous wave signal.

11. A sniffer circuit according to claim 1 wherein the sniffer circuit is collocated in a CDPD system.

12. A sniffer circuit according to claim 1 wherein the threshold value of the comparator circuit of the second sniffer circuit is programmable.

13. A voice and diagnostic signal detection circuit comprising:

a first sniffer circuit for detecting voice signals on a communication channel of a cellular network circuit, the first sniffer circuit having a self test circuit for testing the operation of the first sniffer circuit; and a second sniffer circuit for detecting diagnostic signals on a communication channel of a cellular network circuit, the second sniffer circuit having a self test circuit for testing the operation of the second sniffer circuit.

14. A voice and diagnostic signal detection circuit according to claim 13 wherein the self test circuits of the first and second sniffer circuits generate a continuous wave test signal.

15. A voice and diagnostic signal detection circuit according to claim 13 wherein the first sniffer circuit includes a switch selector for monitoring a particular channel, the switch selector receiving input signals from the cellular system;

a down converter coupled to the switch selector, the down converter converting the signal output from the switch selector to an intermediate frequency;

a signal strength circuit coupled to the down converter, the signal strength circuit converting the output of the down converter to a voltage proportional to energy of the output;

a comparator circuit coupled to the sisal strength circuit, the comparator circuit comparing the output of the signal strength circuit with a threshold value and outputting a detection signal if the voltage output of the signal strength circuit is greater than the threshold of the comparator circuit thus indicating that the particular channel being monitored is not idle; and a self-test circuit coupled to the input of the down converter through a switch to provide a signal for testing the operation of the sniffer circuit.

16. A voice and diagnostic signal detection circuit according to claim 15 wherein the second sniffer circuit includes:

a down converter receiving a diagnostic signals from the cellular system as an input signal and converting the input signal to an intermediate frequency;

a signal strength circuit coupled to the down converter, the signal strength circuit converting the output of the down converter to a voltage proportional to energy of the output; and a comparator circuit coupled to the signal strength circuit, the comparator circuit comparing the output of the signal strength circuit with a threshold value and outputting a detection signal if the voltage output of the signal strength circuit is greater than the threshold of the comparator circuit thus indicating the presence of a diagnostic signal.

* * * * *